(12) United States Patent
Deb et al.

(10) Patent No.: US 11,337,087 B2
(45) Date of Patent: *May 17, 2022

(54) METHODS, SYSTEMS AND COMPUTER READABLE MEDIA FOR PREDICTING RISK IN NETWORK ELEMENTS USING MACHINE LEARNING

(71) Applicants: AT&T Intellectual Property I, L.P., Atlanta, GA (US); AT&T Mobility II LLC, Atlanta, GA (US)

(72) Inventors: Supratim Deb, Edison, NJ (US); He Yan, Berkeley Heights, NJ (US); Karunasish Biswas, Sammamish, WA (US); Joseph Allen Notter, Lakewood, CO (US)

(73) Assignees: AT&T Intellectual Property I, L.P., Atlanta, GA (US); AT&T Mobility II LLC, Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/803,688

(22) Filed: Feb. 27, 2020

(65) Prior Publication Data

US 2020/0367078 A1 Nov. 19, 2020

Related U.S. Application Data

(63) Continuation of application No. 16/414,242, filed on May 16, 2019, now Pat. No. 10,609,578.

(51) Int. Cl.
*H04W 24/04* (2009.01)
*G06N 20/00* (2019.01)
*G06Q 10/06* (2012.01)
*H04W 88/08* (2009.01)
*H04W 84/04* (2009.01)

(52) U.S. Cl.
CPC ............ *H04W 24/04* (2013.01); *G06N 20/00* (2019.01); *G06Q 10/0635* (2013.01); *H04W 84/042* (2013.01); *H04W 88/08* (2013.01)

(58) Field of Classification Search
CPC ... H04W 24/04; H04W 88/08; H04W 84/042; G06Q 10/0635; G06N 20/00
See application file for complete search history.

(56) References Cited

U.S. PATENT DOCUMENTS 8,934,352 B2 1/2015 Pei et al.
9,294,498 B1* 3/2016 Yampolskiy .......... H04W 84/12
(Continued)

*Primary Examiner* — Minjung Kim
(74) *Attorney, Agent, or Firm* — Guntin & Gust, PLC; Mark Wilinski

(57) ABSTRACT

A method, system and computer-readable medium where a weighted composite quality index having a plurality of components for a network element is identified. A historical baseline value from historical data for each component is determined, and a deviation from the historical baseline values is measured. A risk level for the deviation is assigned. A loss score for the measured components is computed by mapping the risk level to a numerical score. An aggregated risk score based on a sum of weighted risk scores for each of the components is computed. An expected risk score based on probabilities associated with the aggregated risk score is determined by computing future probabilities of each risk level at the network element based on a trained machine learning model.

20 Claims, 3 Drawing Sheets

(56) References Cited

U.S. PATENT DOCUMENTS

| | | | | |
|---|---|---|---|---|
| 2008/0049630 | A1* | 2/2008 | Kozisek | H04L 41/0823 |
| | | | | 370/250 |
| 2016/0248797 | A1* | 8/2016 | Yampolskiy | H04L 61/2076 |
| 2016/0249238 | A1* | 8/2016 | Hasesaka | H04W 24/02 |
| 2017/0357807 | A1* | 12/2017 | Harms | G06F 21/568 |
| 2019/0260785 | A1* | 8/2019 | Jenkinson | G06K 9/6218 |
| 2021/0168634 | A1* | 6/2021 | Wangler | H04L 41/5038 |
| 2021/0385331 | A1* | 12/2021 | Kovvali | H04L 41/0631 |

* cited by examiner

METHODS, SYSTEMS AND COMPUTER READABLE MEDIA FOR PREDICTING RISK IN NETWORK ELEMENTS USING MACHINE LEARNING

CROSS REFERENCE TO RELATED APPLICATIONS

This application is a continuation of, and claims priority to, U.S. patent application Ser. No. 16/414,242, filed May 16, 2019, entitled "Methods, Systems And Computer Readable Media For Predicting Risk in Network Elements Using Machine Learning," the entire contents of which are hereby incorporated herein by reference.

TECHNICAL FIELD

The present disclosure relates to the management of networks. More particularly, the disclosure relates to a method, system, and computer program for managing and predicting risk posed by different network devices that may impact customer experience.

BACKGROUND

Modern and next-generation networks have very complex architectures with very large scales. For example, a typical nationwide cellular network consists of around 75000 eNodeBs. This number is expected to grow several-fold with the advent of 5G. Managing and operating such a large network without an impact on customer service-quality is challenging from an operational viewpoint.

Network operators strive to maintain high operational efficiency while maintaining acceptable levels of customer service-quality. The network operators must strive to manage networks of increasingly larger size without proportional increases in operational expenses. Managing network operations manually is becoming increasingly complex, a challenge that is exacerbated by the large number of inconsistent and incompatible hardware and software systems and devices in the enterprise. Furthermore, troubleshooting network, client, or application issues is a complex, end-to-end problem that can often involve over a hundred points of failure between the user and the application.

Currently existing systems for network operations are based on two kinds of capabilities. The first is the use of monitoring tools. These tools help monitor different metrics reflecting customer experience from the network. These metrics are either raw metrics or derived metrics like key performance indicators, anomalies with respect to baseline trends, etc. The second is the use of reactive tools. These tools allow operations personnel to process different network measurements at or after the failure event and perform correlations based on expert knowledge of the network. However, none of these approaches provide a solution towards predicting the risk associated with different elements so that the operation team can react based on high risk elements which have a higher potential of causing service degradation and preempt the poor customer experience.

There is a need to manage a network of increasingly larger size without a proportional increase in operational expenses. There is a need to pro-actively identify the network elements that are more at risk of impacting customer Quality of Experience (QoE).

SUMMARY

One general aspect includes a method including identifying, for a network element, a composite quality index having a plurality of components, and a weight associated with each component in the plurality of components. The method further includes determining a historical baseline value from historical data for each component and measuring a deviation from the historical baseline values in at least one of the plurality of components. A risk level for the deviation is then assigned. A loss score for the at least one of the plurality of components is computed by mapping the risk level to a numerical score. An aggregated risk score based on a sum of risk scores for each of the components weighted by the weight associated with each of the plurality of components is then computed. The method further includes computing an expected risk score based on probabilities associated with the aggregated risk score by computing future probabilities of each risk level at the network element based on a trained machine learning model; and providing a probability of future risk for the network element.

Other aspects include inputting into the trained machine learning model past values of deviations of each member of the plurality of components of the composite quality index; historical baseline values of each component of the plurality of components of the composite quality index; and a future baseline value for each component of the plurality of components of the composite quality index for a period of time. In an aspect, the trained machine learning model is created by computing the historical baseline value of each component of the plurality of components of the composite quality index; extracting raw and derived time series for risk related performance metrics and load and traffic metrics for the network element; and inputting the historical baseline value of each member of the plurality of components of the composite quality index into a risk labeler that assigns the risk level.

One general aspect includes a system including a memory for storing computer instructions and a processor coupled with the memory. The processor executes the computer instructions and performs operations including identifying, for a network element, a composite quality index having a plurality of components and a weight associated with each component in the plurality of components. The operations further include determining a historical baseline value from historical data for each component. The operations further include measuring a deviation from the historical baseline values in at least one of the plurality of components and assigning a risk level for the deviation. A loss score for the at least one of the plurality of components is computed by mapping the risk level to a numerical score. The operations further include computing an aggregated risk score based on a sum of risk scores for each of the components weighted by the weight associated with each of the components and computing an expected risk score based on probabilities associated with the aggregated risk score by computing future probabilities of each risk level at the network element based on a trained machine learning model. The operations also include providing a probability of future risk for the network element.

Other aspects include a system where the processor executes the computer instructions and performs operations including inputting into the trained machine learning model past values of deviations of each member of the plurality of components of the composite quality index; historical baseline values of each component of the plurality of components of the composite quality index; and a future baseline value for each component of the plurality of components of the composite quality index for a period of time. In an aspect, the trained machine learning model is created by computing the historical baseline value of each component of the plurality of components of the composite quality index; extracting raw and derived time series for risk related performance metrics and load and traffic metrics for the network element; and inputting the historical baseline value of each member of the plurality of components of the composite quality index into a risk labeler that assigns the risk level.

One general aspect includes a non-transitory, tangible computer-readable medium having computer-executable instructions stored thereon which, when executed by a computer, cause the computer to perform a method identifying, for a network element, a composite quality index having a plurality of components and a weight associated with each component in the plurality of components. The method further includes determining a historical baseline value from historical data for each component and measuring a deviation from the historical baseline values in at least one of the plurality of components. A risk level for the deviation is then assigned. A loss score for the at least one of the plurality of components is computed by mapping the risk level to a numerical score. An aggregated risk score based on a sum of risk scores for each of the components weighted by the weight associated with each of the plurality of components is then computed. The method further includes computing an expected risk score based on probabilities associated with the aggregated risk score by computing future probabilities of each risk level at the network element based on a trained machine learning model; and providing a probability of future risk for the network element.

DETAILED DESCRIPTION OF ILLUSTRATIVE EMBODIMENTS

Glossary

"Network element" means a facility or equipment used in the provision of a telecommunications service. Network elements may include computers, servers, hubs, switches, nodes, routers, proxies, and other devices coupled to and configured to pass data to one another.

"Machine Learning Model" means a mathematical representation of a real-world process. To generate a machine learning model, one provides training data to a machine learning algorithm to learn from.

"Risk Level" means an element from a set of risk categories. For example, the set of risk categories may comprise three elements: low, medium, and high. Low risk may be defined as an acceptable risk. In this case the service can be used with the identified threats, but the threats must be observed to discover changes that could increase the risk level. Medium risk may be defined as an acceptable risk. For the service to look for each threat, the development of the risk must be monitored on a regular basis with the following consideration whether necessary measures may have to be implemented. A high risk can be defined as a not acceptable risk. In this case one cannot start using the service before risk reducing treatment has been implemented. An alternate set of risk categories may comprise five elements, for example no risk, low risk, medium risk, high risk, and critical risk. So the set of risk categories may comprise a set of two or more elements.

"Composite Quality Index" means a combination of observed quality indicators such as quality of service indicators. For example, a composite quality index for voice quality may include the number of dropped calls, blocked calls and network driven churn. The components of a composite quality index may be weighted. Other quality of service elements may be included in a composite quality index for voice quality such as, for example, call establishment failure, echo, distortion, background noise and call drops. Quality of service elements to be included in a composite quality index for data quality may include packet loss, latency, and jig.

Figure 1:
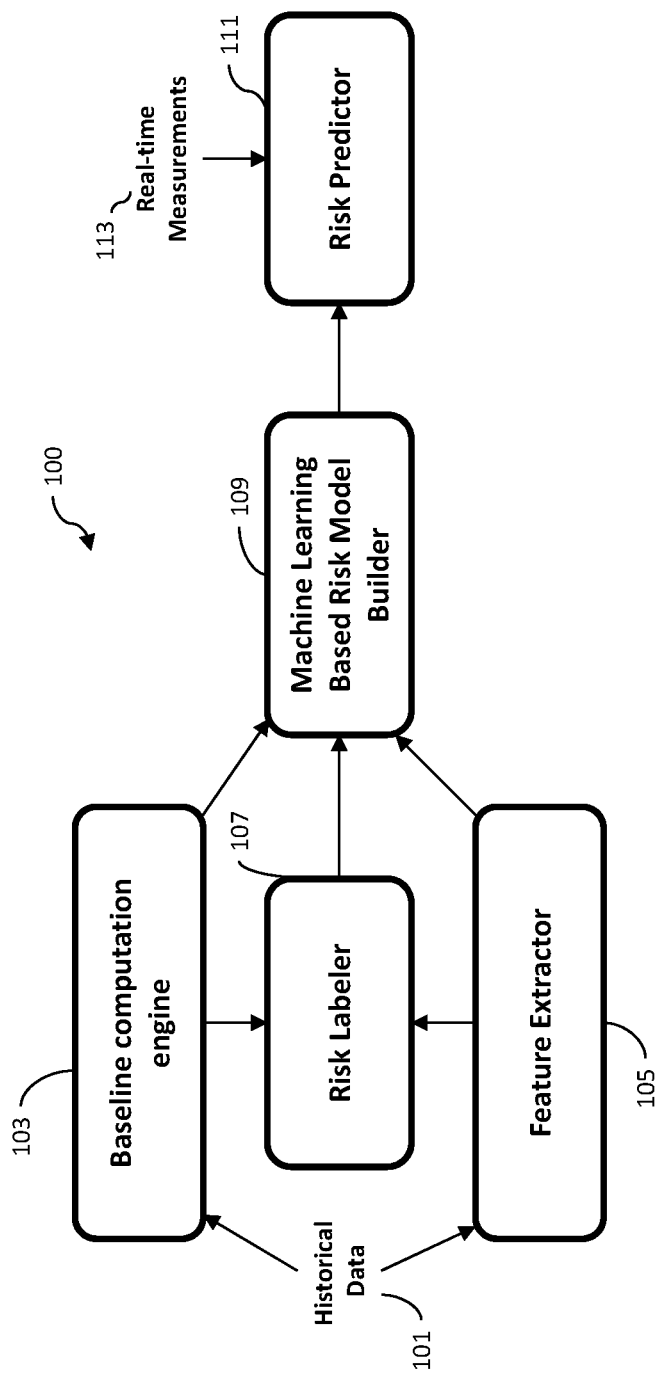
FIG. 1 is a block diagram of a system for predicting risk in a network element.

Illustrated in FIG. 1 is a system 100 for predicting risk in a network element. The system 100 includes a source of historical data 101 about a network element (not shown). The system 100 include a baseline computation engine 103 that computes baseline values for risk related performance metrics and element load related metrics from historical data from the source of historical data 101. The source of historical data 101 also provides data to a feature extractor 105 that extracts raw/derived time series for risk related performance metrics and element load/traffic metrics. Data from the baseline computation engine 103 and the feature extractor 105 is provided to a risk labeler 107 that assigns a risk level for each composite quality index component in the historical data. In one embodiment the risk levels may be no risk, low risk, medium risk, high risk, and critical risk. The baseline computation engine 103, the feature extractor 105, and the risk labeler 107 all provide data to a machine learning based risk model builder 109. The machine learning based risk model builder 109 trains and builds a machine learning model to predict future risk levels for each component in the composite quality index based on risk levels in historical data and other relevant counters. The risk model builder 109 provides a risk model to risk predictor 111 that predicts risk for different elements using the trained machine learning model and real time measurements from a real time measurements source 113.

Building a trained machine learning model involves identifying the relevant data sources. In an embodiment relevant data sources may include sources of data relating to components of a composite quality index for a network device. The data is then prepared to ensure its accuracy. A plurality of machine learning algorithms may be identified. Each of the plurality of algorithms is trained though a supervised process. The best performing algorithm may be selected to identify the best fitting model. The model may then be deployed and risk predictions may be generated. The risk predictions are assessed, and the information created from the analysis of the validity of predictions is fed back to improve the accuracy of the model.

Figure 2:
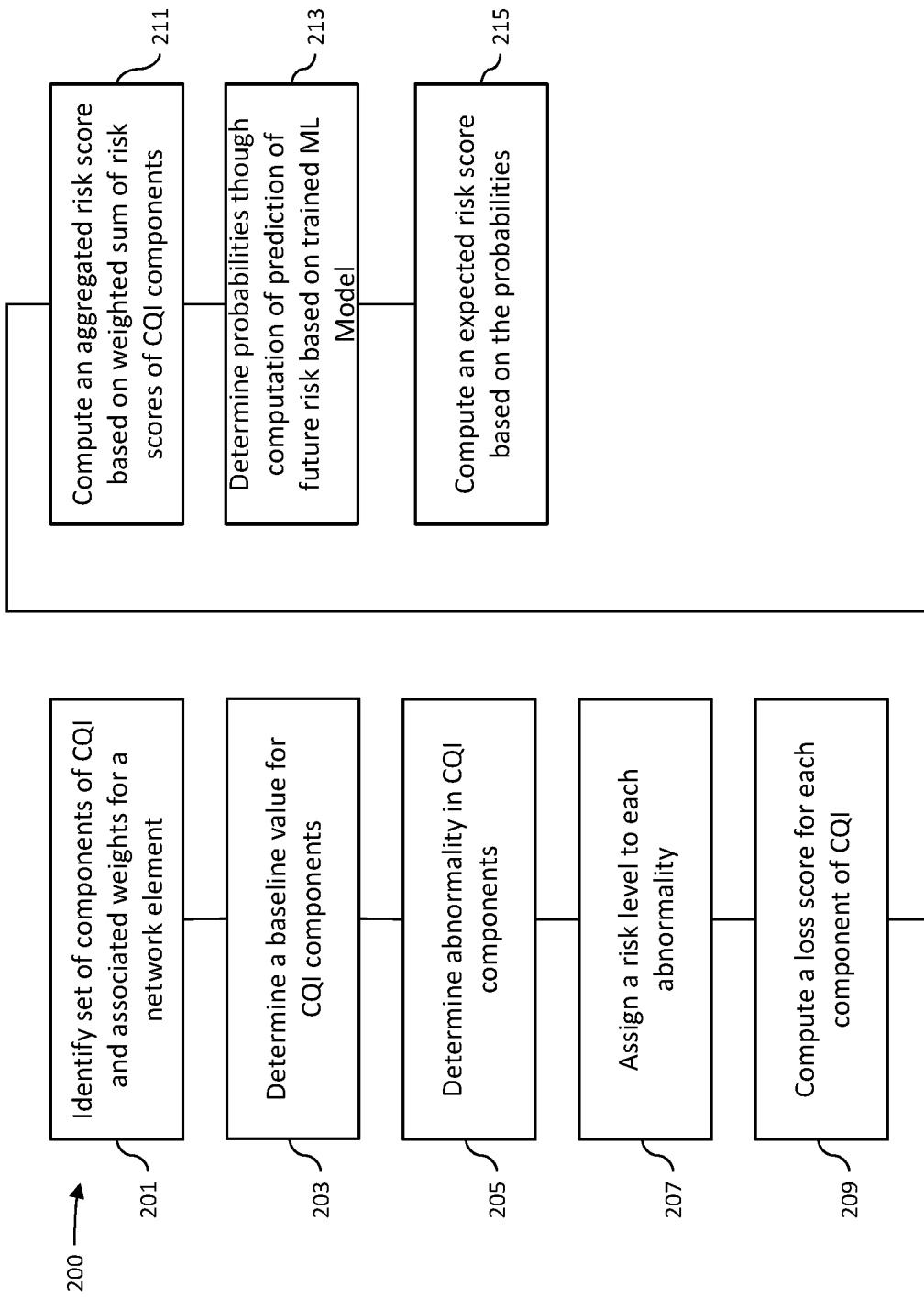
FIG. 2 is a flowchart of an embodiment of a method for computing an expected risk score based on probabilities.

Illustrated in FIG. 2 is a flowchart for an embodiment of a method 200 for computing an expected risk score based on probabilities.

In step 201, the method 200 identifies a set of components of a composite quality index and associated weights for a network element. For example, in the case of prediction of risk levels in a voice over LTE application, the components may be dropped calls or accessibility failures.

In step 203, the method 200 determines a baseline value for the composite quality index components.

In step 205, the method 200 determines any abnormality in the composite quality index components. For example, if the baseline value for dropped calls is two per hour and the measured dropped calls is 10 per hour this step would register an abnormality.

In step 207, the method 200 would assign a risk level to each abnormality. For example, an abnormality identified as a result of 10 dropped calls per hour may be assigned a risk level of high.

In step 209 the method 200 computes a loss score for each component of the composite quality index. The loss score is simply a mapping from the risk level to a numerical score. For example, risk levels may be provided with a numerical score as follows: for a risk level of no risk, the score may be zero; for a risk level of low risk, the score may be one; for a risk level of medium risk, the score may be two or maybe three; for a risk level of high the risk, the score may be four; and for a risk level of critical risk, the score may be five.

In step 211, the method 200 computes an aggregated risk score based on the weighted sum of risk scores of the composite quality index components. For example, if the composite quality index includes call drops, call access failures and network throughput, the aggregated risk may be the sum of the risk score for call drops times the weight assigned to call drops, plus the risk score for call access failures times the weight assigned to call access failures plus the score for network throughput times the weight assigned to network throughput.

In step 213, the method 200 determines the probabilities through computational prediction of future risk based on a trained machine learning model.

In step 215, the method 200 computes an expected risk score based on the probabilities.

Figure 3:
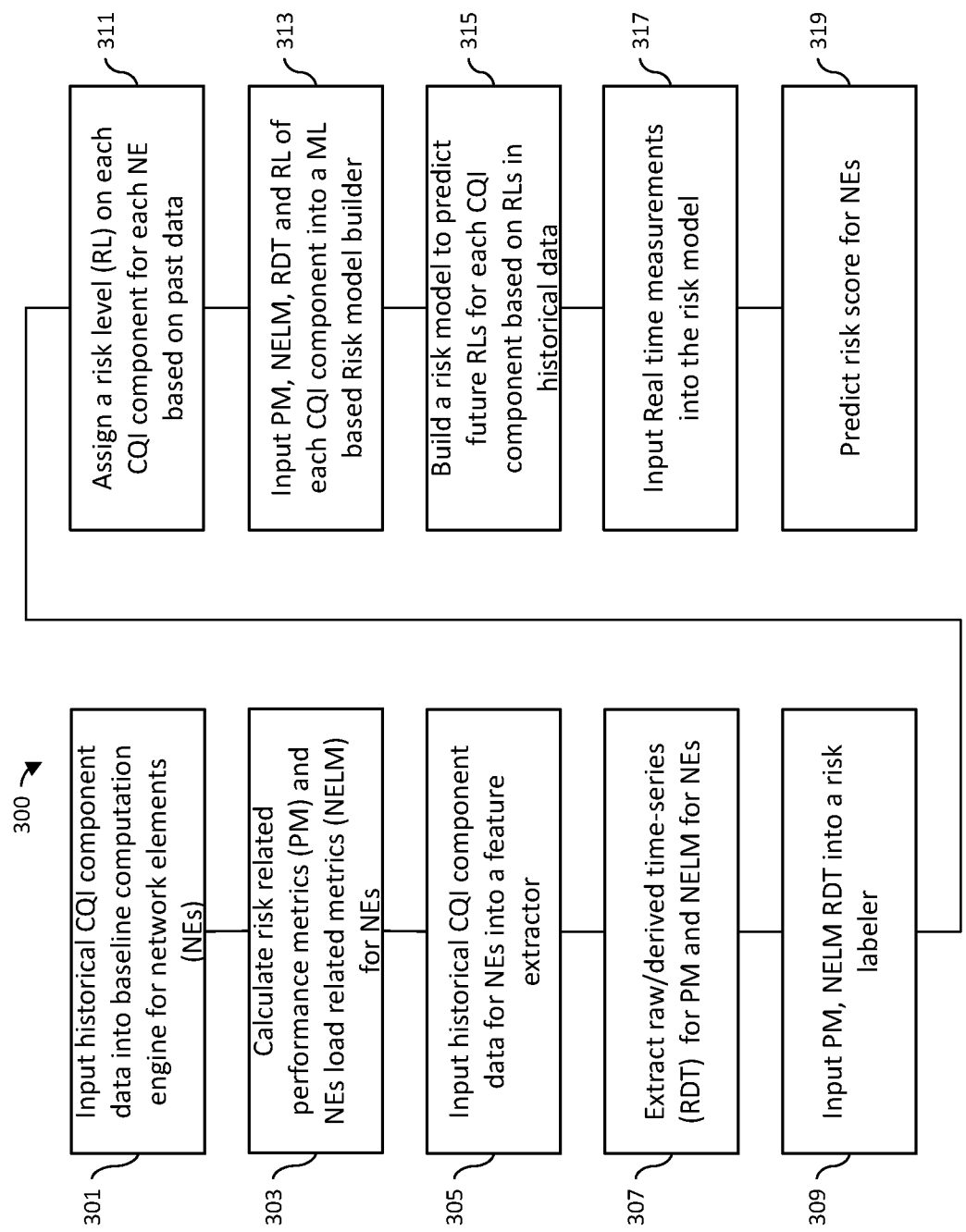
FIG. 3 is a flowchart of a method for predicting the risk score for network elements

Illustrated in FIG. 3 is a flowchart for an embodiment of a method for predicting the risk score for network elements.

In step 301, the method 300 inputs historical composite quality index component data of network elements into a baseline computation engine.

In step 303, the method 300 calculates risk related performance metrics and network element load related metrics for the network elements.

In step 305, the method 300 inputs historical composite quality index component data for the network elements into a feature extractor module. In the case of predicting voice over LTE call drop risk levels, the features used by the feature extractor module may include past values of drop, failure, load, and mobility counters during a predetermined period; for example, the preceding six hours. The features used by the feature extractor may include baselines during these instances and future baseline during a prediction window in a future period; for example, a period of three hours.

In step 307, the method 300 extracts raw or derived time series for the performance metrics and the network element load related metrics.

In step 309, the method 300 inputs the performance metrics, the network element load related metrics, and the raw derived timeseries metrics into a risk labeler.

In step 311, the method 300 assigns a risk level for each of the composite quality index components for each network element based on past data.

In step 313, the method 300 inputs the performance metrics, the network element load related metrics, the raw/derived timeseries data and the risk level of each composite quality index component into a machine learning based risk model builder.

In step 315, the method 300 builds a risk model to predict future risk levels for each composite quality index component based on the risk level of historical data.

In step 317, the method 300 inputs real time measurements of performance metrics and load metrics into the risk model.

In step 319, the method 300 predicts the risk score for the network elements.

While the processes or methods described herein may, at times, be described in a general context of computer-executable instructions, the methods, procedures, and processes of the present disclosure can also be implemented in combination with other program modules and/or as a combination of hardware and software. The term "application," or variants thereof, is used expansively herein to include routines, program modules, programs, components, data structures, algorithms, and the like. Applications can be implemented on various system configurations, including servers, network systems, single-processor or multiprocessor systems, minicomputers, mainframe computers, personal computers, hand-held computing devices, mobile devices, microprocessor-based consumer electronics, programmable electronics, network elements, gateways, network functions, devices, combinations thereof, and the like.

The disclosed embodiments are merely examples that may be embodied in various and alternative forms, and combinations thereof. As used herein, for example, "exemplary," and similar terms, refer expansively to embodiments that serve as an illustration, specimen, model or pattern. The figures are not necessarily to scale and some features may be exaggerated or minimized, such as to show details of particular components. In some instances, well-known components, systems, materials or methods have not been described in detail in order to avoid obscuring the systems, methods, and computer program products of the present disclosure. Therefore, specific structural and functional details disclosed herein are not to be interpreted as limiting, but merely as a basis for the claims and as a representative basis for teaching one skilled in the art.

The above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed:

1. A method comprising:

identifying, for a plurality of network elements, a respective composite quality index (CQI) for each of data quality and voice quality, wherein each respective CQI has a respective plurality of components and a weight associated with each component in the respective plurality of components, wherein the plurality of components of the CQI for voice quality comprises a number of dropped calls, blocked calls, network driven churn, call establishment failure, echo, distortion, and background noise, and wherein the plurality of components of the CQI for data quality comprises packet loss, latency, and jig;

determining a historical baseline value from historical data for each component in the respective plurality of components for each CQI, resulting in historical baseline values;

determining an abnormality from the historical baseline values in at least one of the respective plurality of components for at least one of the CQIs, resulting in an at least one abnormality;

assigning a respective risk level for each abnormality included in the at least one abnormality;

mapping the assigned respective risk level for each abnormality to a respective numerical score;

using a trained machine learning model, determining a respective probability of future risk levels for each component of the respective plurality of components for each CQI based on the mapping; and based on the respective probability of future risk levels, determining which of a subset of the plurality of network elements is at risk of impacting customer quality of experience, wherein the determining of which of the subset of the plurality of network elements is at risk of impacting customer quality of experience is used to preempt poor customer experience by proactively identifying network elements that are more at risk of impacting the customer quality of experience.

2. The method of claim 1, wherein the subset includes an eNodeB.

3. The method of claim 1, wherein the respective risk level for each abnormality comprises a risk level selected from a group comprising no risk, low risk, medium risk, high risk, and critical risk.

4. The method of claim 1, wherein the determining of the respective probability of future risk levels comprises:

inputting data from one or more data sources into the trained machine learning model, wherein the data comprises:

past values of an abnormality of each member of the respective plurality of components of each of the CQIs;

a historical baseline value of each member of the respective plurality of components of each of the CQIs; and a future baseline value for each member of the respective plurality of components of each of the CQIs for a period of time.

5. The method of claim 4, further comprising creating the trained machine learning model by:

computing the historical baseline value of each member of the respective plurality of components of each of the CQIs;

extracting raw and derived time series for risk related performance metrics and load and traffic metrics for each network element of the plurality of network elements; and inputting the historical baseline value of each member of the respective plurality of components of each of the CQIs into a risk labeler.

6. A system comprising:

a memory for storing computer instructions; and a processor coupled with the memory, wherein the processor, responsive to executing the computer instructions, performs operations comprising:

identifying, for a plurality of network elements, a respective composite quality index (CQI) for each of data quality and voice quality, each of the CQIs having a respective plurality of components and a weight associated with each component in the respective plurality of components, wherein the plurality of components of the CQI for voice quality comprises a number of dropped calls, blocked calls, network driven churn, call establishment failure, echo, distortion, and background noise, and wherein the plurality of components of the CQI for data quality comprises packet loss, latency, and jig;

determining a historical baseline value from historical data for each component in the respective plurality of components for each CQI, resulting in historical baseline values;

determining an abnormality from the historical baseline values in at least one of the respective plurality of components for at least one of the CQIs, resulting in an at least one abnormality;

assigning a respective risk level for each abnormality included in the at least one abnormality;

mapping the assigned respective risk level for each abnormality to a respective numerical score;

using a trained machine learning model, calculating a respective probability of future risk levels for each component of the respective plurality of components for each CQI based on the mapping; and based on the respective probability of future risk levels, determining which of a subset of the plurality of network elements is at risk of impacting customer quality of experience, wherein the determining of which of the subset of the plurality of network elements is at risk of impacting customer quality of experience is used to preempt poor customer experience by proactively identifying network elements that are more at risk of impacting the customer quality of experience.

7. The system of claim 6, wherein the subset includes an eNodeB.

8. The system of claim 6, wherein the respective risk level for each abnormality comprises a risk level selected from a group comprising no risk, low risk, medium risk, high risk and critical risk.

9. The system of claim 6, wherein the calculating of the respective probability of future risk levels comprises:

inputting data from one or more data sources into the trained machine learning model, wherein the data comprises:

past values of an abnormality of each member of the respective plurality of components of each of the CQIs;

a historical baseline value of each member of the respective plurality of components of each of the CQIs; and a future baseline value for each member of the respective plurality of components of each of the CQIs for a period of time.

10. The system of claim 9, wherein the processor, responsive to executing the computer instructions, performs operations comprising creating the trained machine learning model by:

computing the historical baseline value of each member of the respective plurality of components of each of the CQIs;

extracting raw and derived time series for risk related performance metrics and load and traffic metrics for each network element of the plurality of network elements; and inputting the historical baseline value of each member of the respective plurality of components of each of the CQIs into a risk labeler.

11. A tangible non-transitory computer-readable medium having computer-executable instructions stored thereon which, when executed by a computer, cause the computer to perform operations comprising:

identifying, for a plurality of network elements, a respective composite quality index (CQI) for each of data quality and voice quality, wherein each respective CQI has a respective plurality of components and a weight associated with each component in the respective plurality of components, wherein the plurality of components of the CQI for voice quality comprises a number of dropped calls, blocked calls, network driven churn, call establishment failure, echo, distortion, and background noise, and wherein the plurality of components of the CQI for data quality comprises packet loss, latency, and jig;
determining a historical baseline value from historical data for each component in the respective plurality of components for each CQI, resulting in historical baseline values;
determining an abnormality from the historical baseline values in at least one of the respective plurality of components for at least one of the CQIs, resulting in an at least on abnormality;
assigning a respective risk level for each abnormality included in the at least one abnormality;
mapping the assigned respective risk level for each abnormality to a respective numerical score;
using a trained machine learning model, determining a respective probability of future risk levels for each component of the respective plurality of components for each CQI based on the mapping; and
based on the respective probability of future risk levels, determining which of a subset of the plurality of network elements is at risk of impacting customer quality of experience,
wherein the determining of which of the subset of the plurality of network elements is at risk of impacting customer quality of experience is used to preempt poor customer experience by proactively identifying network elements that are more at risk of impacting the customer quality of experience.

12. The tangible computer-readable medium of claim 11, wherein the plurality of network elements includes an eNodeB.

13. The tangible computer-readable medium of claim 11, wherein the respective risk level for each abnormality comprises a risk level selected from a group comprising no risk, low risk, medium risk, high risk and critical risk.

14. The tangible computer-readable medium of claim 11, wherein the determining of the respective probability of future risk levels comprises:
inputting data from one or more data sources into the trained machine learning model, wherein the data comprises:
past values of an abnormality of each member of the respective plurality of components of each of the CQIs;
a historical baseline value of each member of the respective plurality of components of each of the CQIs; and
a future baseline value for each member of the respective plurality of components of each of the CQIs for a period of time.

15. The tangible computer-readable medium of claim 14, wherein the operations further comprise creating the trained machine learning model, the creating comprising:
computing the historical baseline value of each member of the respective plurality of components of each of the CQIs;
extracting raw and derived time series for risk related performance metrics and load and traffic metrics for each network element of the plurality of network elements; and
inputting the historical baseline value of each member of the respective plurality of components of each of the CQIs into a risk labeler.

16. The system of claim 6, wherein the mapping comprises computing a loss score for each member of the respective plurality of components of each of the CQIs.

17. The system of claim 6, wherein the operations further comprise:
computing a respective aggregated risk score based on a weighted sum of risk scores for the respective plurality of components of each of the CQIs.

18. The system of claim 6, wherein the at least one abnormality comprises at least a first abnormality in at least a first component of the plurality of components of the CQI for voice quality.

19. The system of claim 18, wherein the at least one abnormality comprises at least a second abnormality in at least a second component of the plurality of components of the CQI for data quality.

20. The system of claim 19, wherein the at least a first abnormality comprises a first plurality of abnormalities, and wherein the at least a second abnormality comprises a second plurality of abnormalities.

* * * * *